Aug. 14, 1928.
C. S. SNAVELY
1,680,482
SIGNAL
Filed March 8, 1923
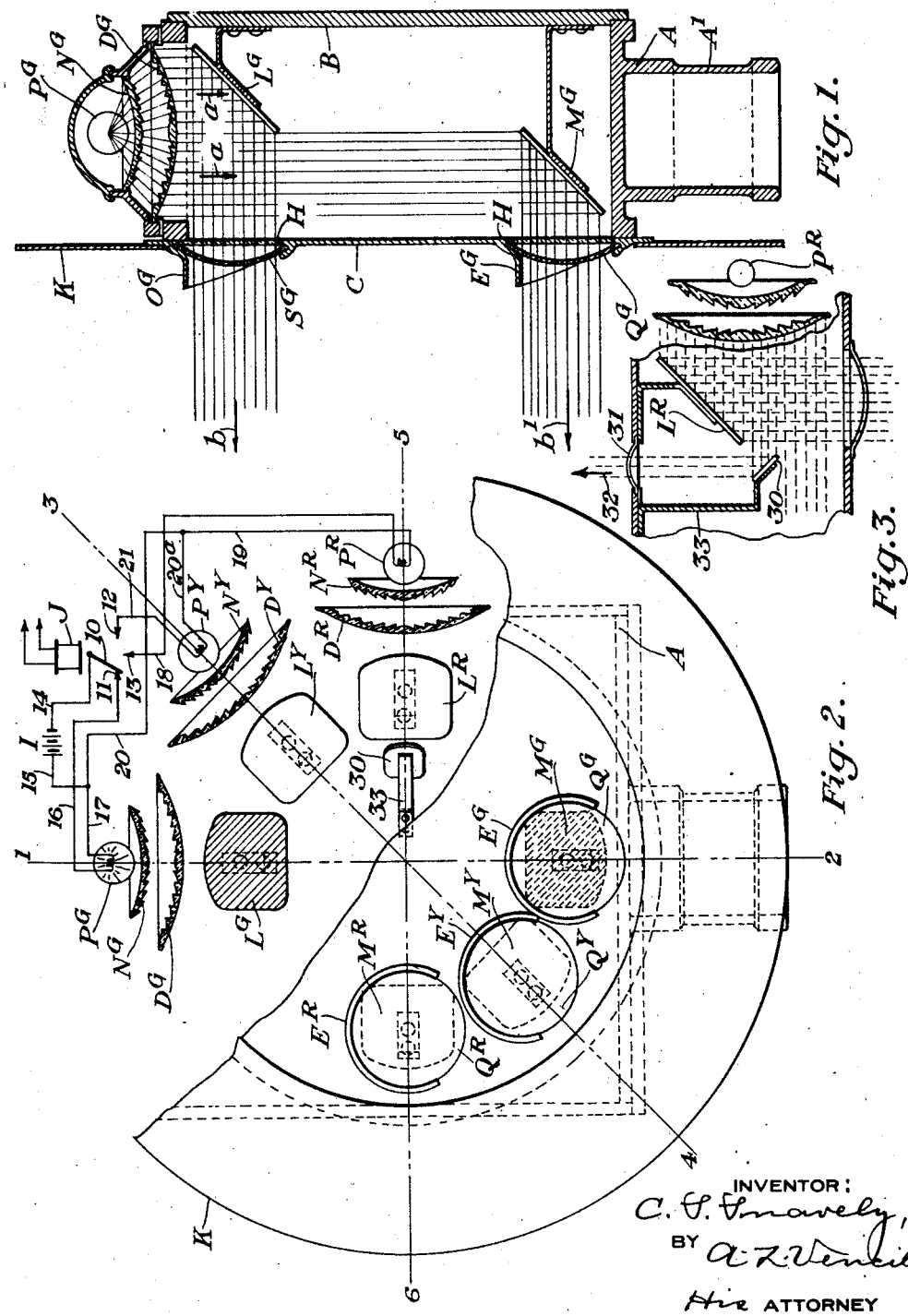

Patented Aug. 14, 1928.

1,680,482

UNITED STATES PATENT OFFICE.

CLARENCE S. SNAVELY, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

SIGNAL.

Application filed March 8, 1923. Serial No. 623,757.

My invention relates to signals, and particularly to signals of the type capable of displaying a plurality of distinctive indications.

I will describe one form of signal embodying my invention, and will then point out the novel features thereof in the claim.

In the accompanying drawings, Fig. 1 is a vertical sectional view showing one form of signal embodying my invention. Fig. 2 is a view, partly diagrammatic, partly sectioned, and partly in elevation showing the optical system and electrical control of the signal shown in Fig. 1 and also embodying my invention. Fig. 3 is a fragmentary sectional view on the line 5—6 of Fig. 2, showing means for producing a back light for the stop indication of the signal.

Similar reference characters refer to similar parts in each of the views.

Referring first to Fig. 1, the signal comprises a suitable casing A provided with a socket A' for mounting the signal, as upon a mast. A back plate B and a front plate C are secured to this casing and form parts thereof. Fastened to the front plate C is a screen K of some suitable material, such as sheet metal, one function of which is to provide a uniform background for the signal indications which are displayed through the front plate C as will hereinafter appear thus increasing the range of visibility of the signal.

Arranged in a suitable recess in the body A of the case are a signal lamp $P^G$, and a pair of lenses $N^G$ and $D^G$. These elements are so arranged that when lamp $P^G$ is lighted a beam of parallel rays is projected therefrom by the lenses $N^G$ and $D^G$. Means are provided for giving this beam of light a distinctive color, as green, which result may be accomplished by making one of the lenses as $N^G$ of green glass. The front plate C is provided with two openings, spaced apart and one of which is directly above the other. The upper of these openings is provided with a cover glass $S^G$ and the lower opening H is provided with a cover glass $Q^G$. These two cover glasses $S^G$ and $Q^G$ are provided with hoods $O^G$ and $E^G$, respectively, one function of which is to increase the visibility of the signals by shielding the glass covers from the direct rays of the sun.

The parallel rays of the beam of green light which emanates from lamp $P^G$ are directed downward in the direction of the arrows $a$ along the axis 1—2 of Fig. 2. A light deflecting device as a mirror $L^G$ is secured to the back plate B in such a position that approximately half of the beam of light from lamp $P^G$ is incident thereupon and is re-directed through cover glass $S^G$ in parallel rays which emerge from the signal in the direction of the arrow $b$. The remainder of the beam emanating from lamp $P^G$ is deflected by a mirror $M^G$, similar to mirror $L^G$, through cover glass $Q^G$ in the direction of arrow $b'$. The appearance of the signal when lamp $P^G$ is lighted, then, is two green lights one vertically above the other, and this I will term "proceed" indication.

The signal is also provided with another electric lamp $P^Y$ from which lenses $N^Y$ and $D^Y$, similar to lenses $N^G$ and $D^G$, project a beam of parallel rays of yellow light along the axis 3—4. Mirrors $L^Y$ and $M^Y$, similar to $L^G$ and $M^G$, are so located that this beam is deflected through two cover glasses only, one of which, $Q^Y$ is shown in the drawing and which are on a line at 45 angular degrees with the vetrical. When lamp $P^Y$ is lighted the signal indication is two yellow lights so disposed that a line drawn through them will make approximately 45 degrees with the vertical and this I will term a "caution" indication.

In a similar fashion a red lamp $P^R$ serves when lighted to project two beams of red light from two cover glasses only one of which, $Q^R$, is shown in the drawing. The indication displayed by the signal when lamp $P^R$ is lighted is two red lights so located that a line drawn through them is substantially horizontal, and this I will term a "stop" indication. The cover glass associated with the lamps $P^Y$ and $P^R$ are provided with hoods which are similar in all respects to the hoods $D^G$ and $E^G$ provided for the cover glasses associated with lamp $P^G$.

The lamps are controlled in any suitable manner such as by a three position relay J, which in turn may be controlled by any suitable means, not shown in the drawing. It is sufficient to say that this relay J is provided with a movable contact finger 10 which is capable of assuming three positions which in practice will correspond to stop, caution and proceed indications of the signal. The lamp P$^G$ is provided with a circuit which passes from a suitable source of energy such as a battery I, through wire 14, contact 10—11 of relay J, wire 16, lamp P$^G$, and wires 17 and 15 back to battery I. This circuit is closed only when contact 10—11 of relay J is closed, in which case lamp P$^G$ is lighted and the signal displays a "proceed" indication. A circuit is provided for lamp P$^Y$ which passes from battery I through wire 14, contact 10—12 of relay J, wire 21, lamp P$^Y$, and wires 20$^a$, 20 and 15 back to battery I. This circuit is closed only when contact 10—12 of relay J is closed, in which case lamp P$^Y$ is lighted and the signal displays a "caution" indication. Lamp P$^R$ is also provided with a circuit which passes from battery I through wire 14, contact 10—13 of relay J, wire 18, lamp P$^R$, and wires 19, 20 and 15 back to battery I. This circuit is closed only when contact 10—13 of relay J is closed, in which case the signal displays a "stop" indication.

Under certain conditions it is desirable that an observer, stationed at a point in rear of the signal as for example on a train which has passed the signal moving in the direction in which the signal governs, be able to ascertain whether the signal is displaying a "stop" indication.

As shown in the drawing this is accomplished as follows: The back wall B of the signal casing is provided with an aperture fitted with a cover glass 31 so located that a small mirror 30 interposed in the beam of light projected from lamp P$^R$ will reflect light towards the rear of the signal through this cover glass. The small mirror 30 may be supported by any suitable means such as a bracket 33 and is located adjacent one of the horizontally spaced mirrors as L$^R$ as best shown in Fig. 3. It is plain that light will be projected through lens 31 only when lamp L$^R$ is lighted.

One advantage of my invention is the fact that the indication of the signal is given both by the color of the lights and the position of the lights. Thus the signal is correctly readable by persons partially or completely color blind and displays a double indication. Another advantage is that the signal has no moving parts and is therefore rugged and durable.

Although I have herein shown and described only one form of signal embodying my invention, it is understood that various changes and modifications may be made therein within the scope of the appended claim without departing from the spirit and scope of my invention.

Having thus described my invention, what I claim is:

A signal comprising a plurality of lamps disposed in a vertical plane, optical means associated with each lamp for projecting from the lamp an original beam of parallel rays directed toward a common center in said vertical plane, and two light reflectors located in each original beam and staggered horizontally so that one deflector is on one side of said vertical plane and the other deflector is on the other side of said vertical plane whereby said deflectors intercept two different portions of the original beam, the two deflectors for each lamp being parallel and located on opposite sides of a horizontal axis through said common center, all of said deflectors being disposed at the same angle with said horizontal axis, and each of them being positioned to redirect its portion of an original beam in a secondary beam parallel to said axis.

In testimony whereof I affix my signature.

CLARENCE S. SNAVELY.